United States Patent
Nonaka

(10) Patent No.: US 6,731,086 B2
(45) Date of Patent: May 4, 2004

(54) MOTOR DRIVING DEVICE

(75) Inventor: Masataka Nonaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/132,303

(22) Filed: Apr. 26, 2002

(65) Prior Publication Data

US 2002/0180391 A1 Dec. 5, 2002

(30) Foreign Application Priority Data

Apr. 26, 2001 (JP) .......................................... 2001-129879
Apr. 26, 2001 (JP) .......................................... 2001-129898

(51) Int. Cl.$^7$ ................................................ H02P 7/00
(52) U.S. Cl. ........................ 318/459; 318/445; 318/254; 318/823
(58) Field of Search ................................ 318/254, 445, 318/459, 823

(56) References Cited

U.S. PATENT DOCUMENTS 4,578,623 A * 3/1986 Tsukutani et al. ............ 318/254
4,651,069 A * 3/1987 Pellegrini .................... 318/254
5,327,053 A * 7/1994 Mann et al. .................. 318/254

FOREIGN PATENT DOCUMENTS

JP          401308157 A  * 12/1989  .......... H02K/29/00

* cited by examiner

Primary Examiner—Rita Leykin
(74) Attorney, Agent, or Firm—Morgan, Lewis & Bockius LLP

(57) ABSTRACT

In a motor driving device that drives a motor by energizing a coil of a first phase and a coil of a second phase provided in the motor in one direction alternately, which phase to energize is switched according to a back electromotive force appearing in the coil of each phase of the motor as a rotor of the motor rotates. This circuit configuration eliminates the need for an external sensor to detect the position of the rotor, and thus helps promote cost reduction and miniaturization. Here, where no external sensor is used to detect the position of the rotor, the motor is started by first bringing the rotor to rest in a particular position and then energizing the coil of a particular phase. This permits the motor to be started always in the same rotation direction, and thus helps prevent reverse rotation of the motor.

4 Claims, 8 Drawing Sheets

US 6,731,086 B2

MOTOR DRIVING DEVICE

BACKGROUND OF THE INVENTION

1. Field of the Invention

The present invention relates to a motor driving device. More particularly, the present invention relates to a two-phase half-wave motor driving device that drives a motor by energizing a coil of a first phase (a first-phase coil) and a coil of a second phase (a second-phase coil) provided in the motor in one direction alternately, and to a sensorless motor driving device that drives a motor by controlling energization of coils of individual phases provided in the motor according to the result of detecting the position of a rotor of the motor without using an external sensor such as a hole element.

2. Description of the Prior Art

FIG. 11 shows a block diagram of a conventional, common two-phase half-wave motor driving device 100'. A hole element H is arranged so as to face a rotor of a motor M. A comparator 101 outputs a binary signal that represents the relationship in magnitude between the voltages output from both ends of the hole element H. A commutation portion 102, according to the binary signal output from the comparator portion 101, decides which of two transistors T1 and T2, which together constitute an output portion 104, to turn on, and outputs a logic signal to be fed to the gates of the transistors T1 and T2.

The signal output from the commutation portion 102 is converted, by a pre-drive portion 103, to a level high enough to turn on and off the transistors T1 and T2, and is then fed to the gates of the transistors T1 and T2. In the output portion 104, an n-channel MOS field-effect transistor T1 is connected between one end of a first-phase coil L1, of which the other end is connected to a drive voltage $V_M$ for the motor M, and ground. Moreover, an n-channel MOS field-effect transistor T2 is connected between one end of a second-phase coil L2, of which the other end is connected to the drive voltage $V_M$ for the motor M, and ground.

The signal output from the hole element H represents the position of the rotor. Thus, with the circuit configuration described above, it is possible to switch which phase to energize with appropriate timing according to the position of the rotor, and thereby rotate the rotor smoothly.

The problem with this conventional, common two-phase half-wave motor driving device is that it requires an external sensor (hole element) to detect the position of the rotor. This has been hindering cost reduction and miniaturization.

SUMMARY OF THE INVENTION

An object of the present intention is to provide a two-phase half-wave motor driving device that helps promote cost reduction and miniaturization.

Another object of the present invention is to provide a sensorless motor driving device that, despite having a simple circuit configuration, prevents reverse rotation of a motor.

To achieve the above objects, according to one aspect of the present invention, in a motor driving device for driving a motor by energizing a coil of a first phase and a coil of a second phase provided in the motor in one direction alternately, which phase to energize is switched according to a back electromotive force appearing in the coil of each phase of the motor as a rotor of the motor rotates.

This circuit configuration eliminates the need for an external sensor for detecting the position of the rotor, and thus helps promote cost reduction and miniaturization.

Here, the back electromotive force that appears in the coil of each phase as the rotor rotates has a sinusoidal waveform that is synchronous with the rotation of the motor, and becomes equal to zero when the rotor is at an electrically stationary point. This makes it possible to detect the position of the rotor according to the back electromotive force appearing in the coil of each phase. Accordingly, for example, by switching which phase to energize when the back electromotive force appearing in the coil of the phase that is not being energized as the rotor rotates crosses a threshold level, it is possible to rotate the rotor as smoothly as when an external sensor is used to detect the position of the rotor.

In a case where which phase to energize is switched when the back electromotive force appearing in the coil of the phase that is not being energized as the rotor rotates crosses a threshold level, it is preferable that the threshold level be so set that the voltage at the open end of the coil of the phase that is not being energized is not higher than zero if this end is on the current outflow side when this phase is energized, and that the voltage at the open end of the coil of the phase that is not being energized is not lower than zero if this end is on the current inflow side when this phase is energized. This makes it possible to prevent the motor's failure to rotate resulting from spike noise that appears in the coil of each phase when the coil of each phase is switched from an energized state to a de-energized state.

Which phase to energize may be switched by first stopping energizing the coil of the phase that has been energized thus far, and then starting energizing the coil of the phase that has not been energized thus far. This circuit configuration prevents the first and second phases from being energized simultaneously when which phase to energize is switched, and thus helps reduce power consumption and ensure efficient rotation of the motor.

According to another aspect of the present invention, in a motor driving device for driving a motor by controlling energization of coils of individual phases of the motor according to the result of detecting the position of a rotor of the motor without using an external sensor, the motor is started by first bringing the rotor to rest in a particular position and then energizing the coil of a particular phase.

This circuit configuration permits the motor to be started always in the same rotation direction, and thus prevents reverse rotation of the motor.

Specifically, in a case where the motor driving device is used to drive a motor that is so designed that its rotor does not come to rest at an electrically stationary point, the rotor is brought to rest in the particular position by first energizing the coil of a particular phase and then de-energizing the coils of all phases.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
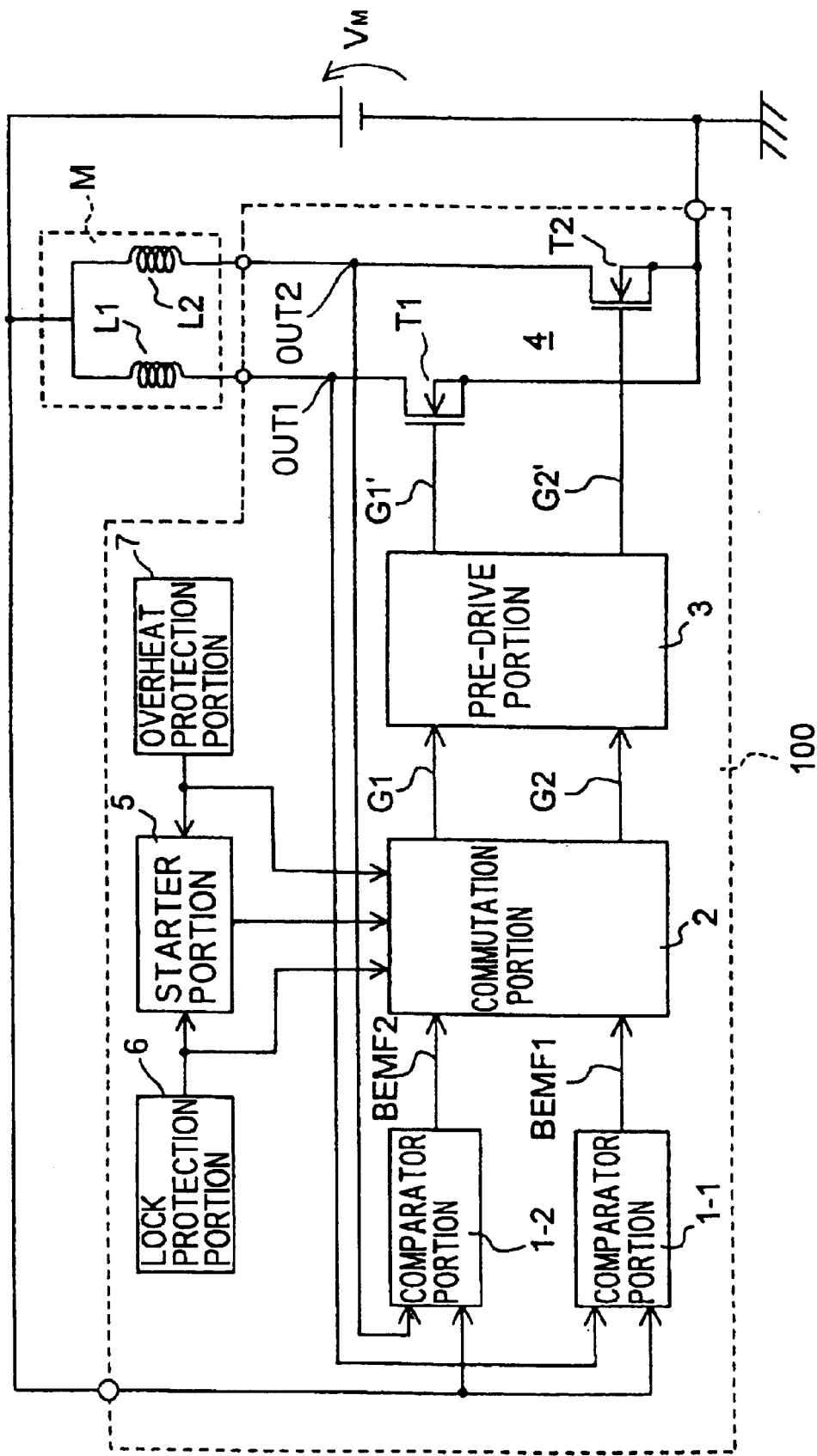
FIG. 1 is a block diagram of a two-phase half-wave fan motor embodying the invention.

Hereinafter, embodiments of the present invention will be described with reference to the drawings. FIG. 1 is a block diagram of a two-phase half-wave fan motor driving device 100 embodying the invention which is designed for the driving of a two-phase half-wave motor used as a fan motor. In this figure, reference numerals 1-1 and 1-2 represent respectively a first and a second comparator portion, reference numeral 2 represents a commutation portion, reference numeral 3 represents a pre-drive portion, reference numeral 4 represents an output portion, reference numeral 5 represents a starter portion, reference numeral 6 represents a lock protection portion, and reference numeral 7 represents an overheat protection portion. Reference symbols L1 and L2 represent respectively a first-phase coil and a second-phase coil of a motor M.

The comparator portion 1-1 outputs a binary signal BEMF1 that represents the relationship in magnitude between the voltage at the output point OUT1 for the first phase (i.e. the node between the first-phase coil L1 and a transistor T1 included in the output portion 4) and a driving voltage $V_M$ for the motor M. The comparator portion 1-2 outputs a binary signal BEMF2 that represents the relationship in magnitude between the voltage at the output point OUT2 for the second phase (i.e. the node between the second-phase coil L2 and a transistor T2 included in the output portion 4) and the driving voltage $V_M$ for the motor M.

The commutation portion 2, according to the signals BEMF1 and BEMF2 output respectively from the comparator portions 1-1 and 1-2, produces and outputs signals G1 and G2 by which the transistors T1 and T2 constituting the output portion 4 are respectively turned on and off in such a way that the rotor of the motor rotates smoothly.

The pre-drive portion 3 performs level conversion on the signals G1 and G2 output from the commutation portion 2 to make their levels high enough to turn on and off the transistors T1 and T2 constituting the output portion 4, and then feeds those signals to the gates of the transistors T1 and T2.

The output portion 4 is composed of an n-channel MOS field-effect transistor T1 connected between one end of the first-phase coil L1, of which the other end is connected to the drive voltage $V_M$ for the motor M, and ground and an n-channel MOS field-effect transistor T2 connected between one end of the second-phase coil L2, of which the other end is connected to the drive voltage $V_M$ for the motor M, and ground.

When the motor M is started, the starter portion 5 triggers the rotor to start rotating by feeding starting signals respectively to the gates of the transistors T1 and T2 constituting the output portion 4. How the starter portion 5 operates will be described specifically later.

On the basis of the output signals from the comparator portions 1-1 and 1-2 and the internal signals within the commutation portion 2, the lock protection portion 6 checks whether the motor is locked or not (for example, when those signals remain unchanged for a predetermined period, the motor is recognized to be locked). If the motor continues being driven in the locked state, the motor and the driving device will be destroyed. To prevent this, when the motor is recognized to be locked, the lock protection portion 6 de-energizes the coils of both phases of the motor and, a predetermined period thereafter, makes the starter portion 5 restart the motor. The overheat protection portion 7 prevents thermal runaway by monitoring the ambient temperature and, when the monitored temperature exceeds a predetermined level, de-energizing the coils of both phases of the motor.

Figure 2:
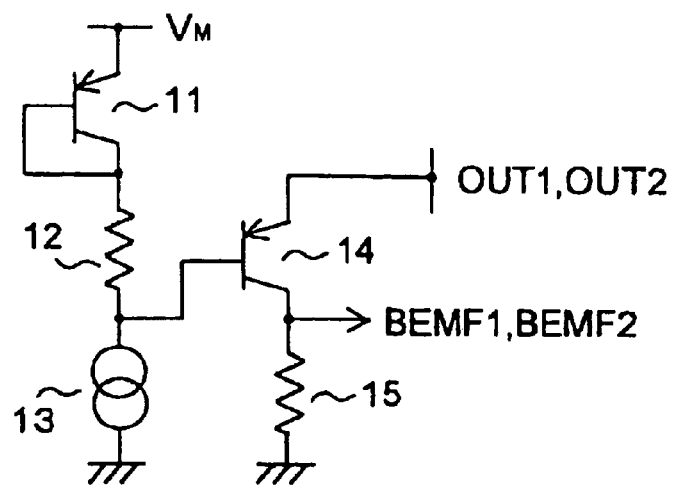
FIG. 2 is a diagram showing a practical example of the circuit configuration of the comparator portions shown in FIG. 1.

FIG. 2 shows a practical example of the circuit configuration of the comparator portions 1-1 and 1-2. A pnp-type transistor 11 has its emitter connected to the drive voltage $V_M$ for the motor M, and has its base and collector connected together. A resistor 12 is connected, at one end, to the collector of the transistor 11 and, at the other end, to one end of a constant-current circuit 13, which is grounded at the other end. A pnp-type transistor 14 has its base connected to the node between the resistor 12 and the constant-current circuit 13, has its emitter connected to the output point of the corresponding phase (i.e. to the output point OUT1 of the first phase in the case of the comparator portion 1-1, and to the output point OUT2 of the second phase in the case of the comparator portion 1-2), and has its collector connected to one end of a resistor 15, which is grounded at the other end. The node between the collector of the transistor 14 and the resistor 15 serves as the output terminal at which the signal BEMF1 or BEMF2 appears.

In this circuit configuration, if variations in the base-emitter forward voltage of the transistors 11 and 14 are ignored, when the voltages at the output points OUT1 and OUT2 of the first and second phases are higher than threshold voltages that are lower than the drive voltage $V_M$ for the motor M by the voltage drop across the resistor 12, the transistor 14 turns on, and thus the signals BEMF1 and BEMF2 respectively turn to a high level. On the other hand, when those voltages are not higher than the threshold voltages, the transistor 14 turns off, and thus the signals BEMF1 and BEMF2 respectively turn to a low level. The voltage drop across the resistor 12 is set to be so small that the threshold voltages are substantially equal to the drive voltage $V_M$ for the motor M.

Figure 3:
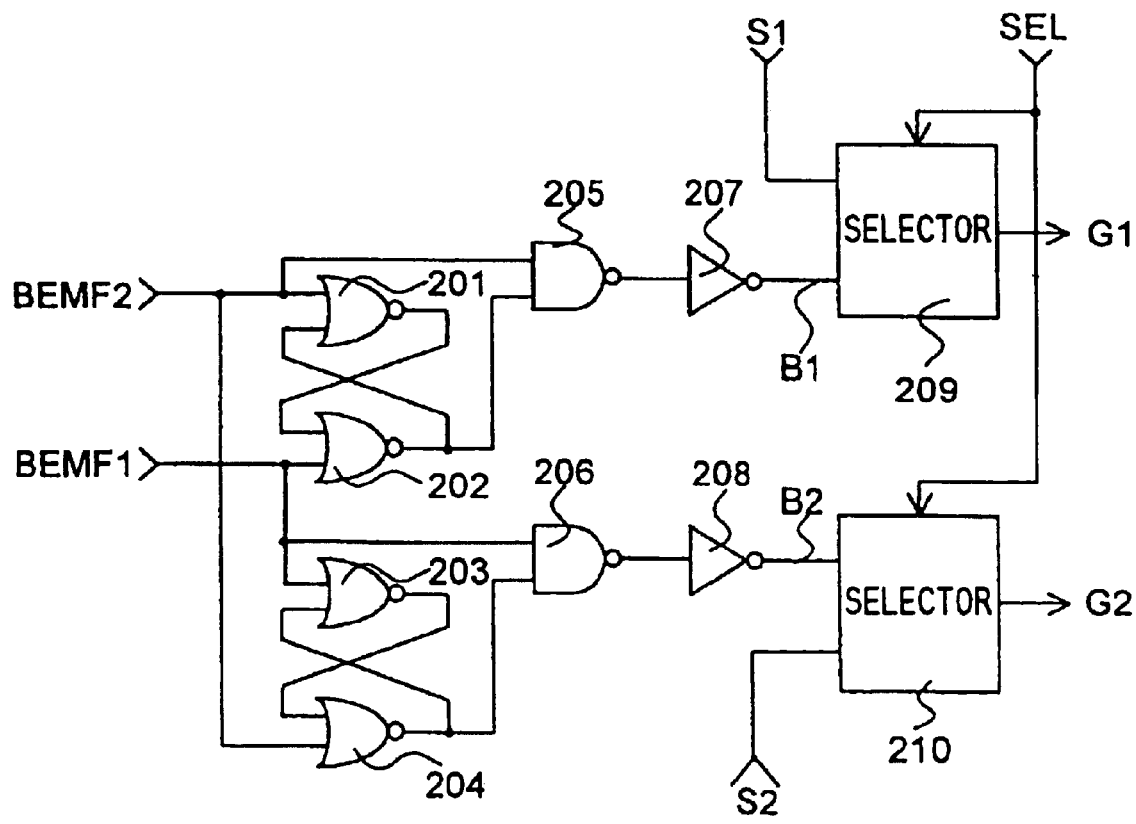
FIG. 3 is a diagram showing a practical example of the circuit configuration of the commutation portion shown in FIG. 1.

FIG. 3 shows a practical example of the circuit configuration of the commutation portion 2. As shown in this figure, the commutation portion 2 is composed of NOR circuits 201, 202, 203, and 204, NAND circuits 205 and 206, NOT circuits (inverter circuits) 207 and 208, and selectors 209 and 210. These are interconnected as follows.

Between the NOR circuits 201 and 202, the output terminal of one is connected to one of the input terminals of the other so as to form an RS flip-flop circuit. The NOR circuit 201 receives, at the other input terminal, the signal BEMF2 output from the comparator portion 1-2, and the NOR circuit 202 receives, at the other input terminal, the signal BEMF1 output from the comparator portion 1-1.

The NAND circuit 205 receives, at one input terminal, the signal BENE2 output from the comparator portion 1-2 and, at the other input terminal, the output of the NOR circuit 202. The output terminal of the NAND circuit 205 is connected to the input terminal of the NOT circuit 207.

Between the NOR circuits 203 and 204, the output terminal of one is connected to one of the input terminals of the other so as to form an RS flip-flop circuit. The NOR circuit 203 receives, at the other input terminal, the signal BEMF1 output from the comparator portion 1-1, and the NOR circuit 204 receives, at the other input terminal, the signal BEMF2 output from the comparator portion 1-2.

The NAND circuit 206 receives, at one input terminal, the signal BEMF1 output from the comparator portion 1-1 and, at the other input terminal, the output of the NOR circuit 204. The output terminal of the NAND circuit 206 is connected to the input terminal of the NOT circuit 208.

As a result, the signals BEMF1 and BEMF2 output respectively from the comparator portions 1-1 and 1-2 and the back electromotive force drive signals B1 and B2 output respectively from the NOT circuits 207 and 208 have a relationship as shown in Table 1; that is, the signals B1 and B2 are never at a high level at the same time. Thus, the transistors T1 and T2 of the output portion 4 are never on together. In Table 1, "1" represents a high level, and "0" represents a low level.

The selector 209 receives the back electromotive force drive signal B1 output from the NOT circuit 207 and a starting signal S1 output from the starter portion 5. The selector 209 selects one of these two signals according to a select signal SEL output from the starter portion 5, and outputs the selected signal. Specifically, the selector 209 outputs the starting signal S1 when the select signal SEL is at a low level, and outputs the back electromotive force drive signal B1 when the select signal SEL is at a high level.

The selector 210 receives the back electromotive force drive signal B2 output from the NOT circuit 208 and a starting signal S2 output from the starter portion 5. The selector 210 selects one of these two signals according to the select signal SEL output from the starter portion 5, and outputs the selected signal. Specifically, the selector 210 outputs the starting signal S2 when the select signal SEL is at a low level, and outputs the back electromotive force drive signal B2 when the select signal SEL is at a high level.

The selectors 209 and 210 respectively output signals G1 and G2, which are fed to the pre-drive portion 3, where they are subjected to level conversion to be converted into signals G1' and G2', which are fed to the gates of the transistors T1 and T2 constituting the output portion 4.

Now, an example of how the motor is started in this embodiment will be described with reference to a timing chart in FIG. 4. When an internal reset signal R rises as a result of power-on resetting (point $p_1$ in FIG. 4), the starter portion 5 switches the select signal SEL between a low level and a high level with a predetermined duty factor, and inverts the starting signals S1 and S2 individually on trailing edges of the select signal SEL. The starter portion 5 outputs the starting signals S1 and S2 in opposite phases.

Thus, the transistor T1 receives at its gate alternately the starting signal S1 output from the starter portion 5 and the back electromotive force drive signal B1 through the pre-drive portion 3, and the transistor T2 receives at its gate alternately the starting signal S2 and the back electromotive force drive signal B2 through the pre-drive portion 3. Accordingly, the first-phase coil L1 and the second-phase coil L2 are energized alternately.

Thus, if it is assumed that the rotor starts rotating at point $p_2$ in FIG. 4, a back electromotive force appears at the output point of the phase that is not being energized (in the case being discussed, OUT2), and, while the select signal SEL is at a high level, the voltage at the output point OUT2 of the phase that is not being energized drops below the threshold voltage ($\approx V_M$) of the comparator portion 1-2 substantially at a dead point (point $p_3$ in FIG. 4).

Thus, the signal BEMF2 turns to a low level. Thus, the back electromotive force drive signal B1 turns to a low level. Thus, the transistor T1 turns off. Thus, a back electromotive force appears at the output point OUT1, causing the voltage at the output point OUT1 to rise above the threshold voltage. Thus, the signal BEMF1 turns to a high level. Thus, the back electromotive force drive signal B2 turns to a high level. Thus, the transistor T2 turns on. Thus, the voltage at the output point OUT2 turns to a low level. That is, the back electromotive force drive signals B1 and B2, which are in opposite phases, are individually inverted substantially at dead points. In this way, which phase to energize is switched, and the rotation of the motor is thereby maintained.

When, while the select signal SEL is at a high level, the voltage at the output point of the phase that is not being energized drops below the threshold voltages ($\approx V_M$) of the comparator portions, this serves as a trigger that causes the starter portion 5 to keep the select signal SEL at a high level. Therefore, even after point $p_3$ in FIG. 4, the back electromotive force drive signals B1 and B2, which are in opposite phases and are inverted substantially at dead points, continue controlling the turning on and off of the transistors T1 and T2. Thus, which phase to energize is switched substantially at dead points, and the rotation of the motor is thereby maintained.

As described above, in this embodiment, which phase to energize is switched according to the back electromotive force appearing in the coil of each phase as the rotor rotates. This eliminates the need to use a hole element to detect the position of the rotor, and thus helps promote cost reduction and miniaturization.

Figure 5:
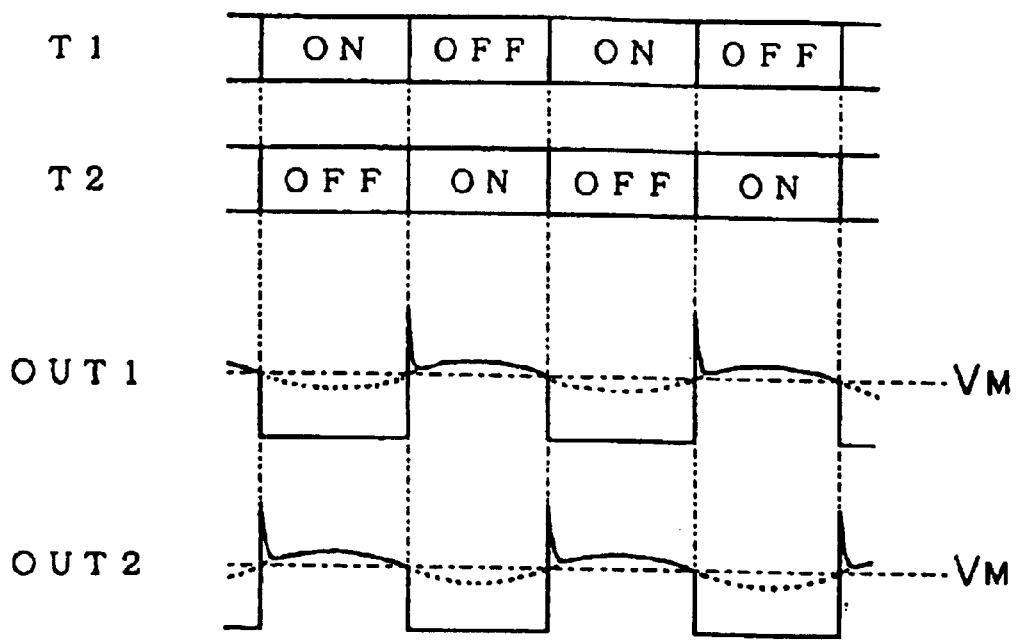
FIG. 5 is a diagram showing how a back electromotive force appears in the coil of each phase as the rotor rotates.

When the rotor is rotating, a magnet fixed to the rotor moves together, causing the magnetic flux passing through the coil of each phase to vary with time. Thus, a back electromotive force appears in the coil of each phase, and therefore the voltage at the output point of the phase that is not being energized has a waveform as shown in FIG. 5 with the back electromotive force superposed on the drive voltage $V_M$ for the motor M. The back electromotive force has a sinusoidal waveform that is synchronous with the rotation of the rotor, becoming equal to zero when the rotor is at an electrically stationary point. Therefore, it is possible to detect the position of the rotor according to the back electromotive force appearing in the coil of each phase. This makes it possible to rotate the rotor as smoothly as when a hole element is used by, as described above, switching which phase to energize according to the back electromotive force appearing in the coil of each phase as the rotor rotates.

Moreover, in this embodiment, when the voltage at the output point of the phase that is not being energized drops below the drive voltage $V_M$ for the motor (in other words, when the back electromotive force appearing in the coil of the phase that is not being energized drops below zero), this serves as a trigger that causes the coil of the phase that has been energized thus far to stop being energized. As a result, a back electromotive force causes the voltage at the output point of the phase that has been energized to rise above the drive voltage $V_M$ for the motor (in other words, the back electromotive force appearing in the coil of the phase that has been energized rises above zero), and this serves as a trigger that causes the coil of the phase that has not been energized thus far to start being energized. Therefore, the first and second phases are never energized at the same time when which phase to energize is switched. This helps reduce power consumption, and ensures efficient rotation of the motor.

Figure 6:
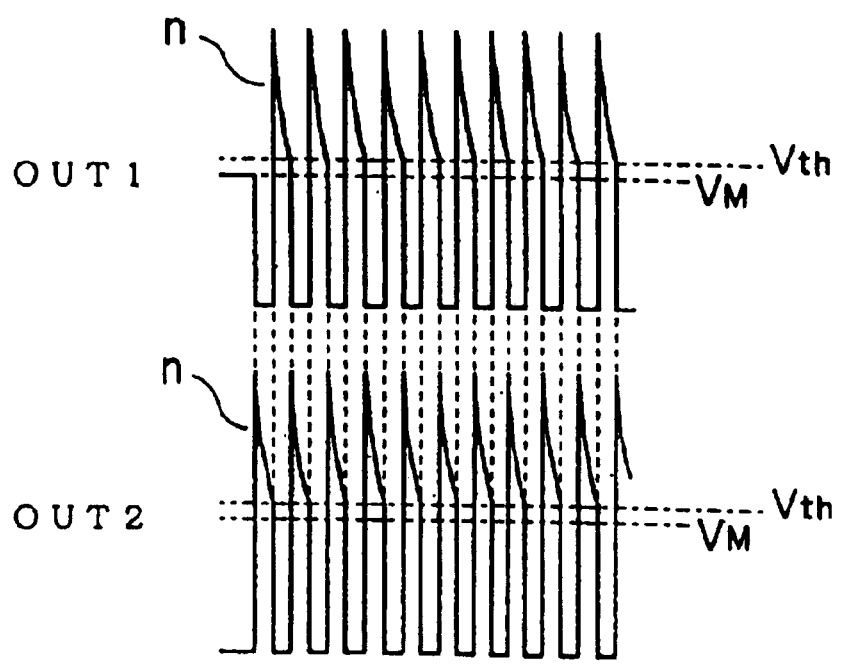
FIG. 6 is a diagram illustrating the problem that arises when the threshold voltage of the comparator portions is higher than the motor drive voltage.

In the voltages at the output points OUT1 and OUT2 of the first and second phases, spike noise "n" as shown in FIG. 6 appears when the coils of the first and second phases are respectively switched from an energized state to a de-energized state. Thus, if the threshold voltages $V_{th}$ of the comparator portions 1-1 and 1-2 are higher than the drive voltage $V_M$ for the motor M, even when the rotor is not rotating, the output signals BEMF1 and BEMF2 of the comparator portions 1-1 and 1-2 may vary, causing entry into the mode in which the back electromotive force drive signals B1 and B2 control the turning on and off of the transistors T1 and T2 constituting the output portion 4. In this state, as shown in FIG. 6, which phase to energize is switched so fast that the rotor does not rotate.

In this embodiment, however, the comparators 1-1 and 1-2 have the circuit configuration shown in FIG. 2, and therefore, as long as variations in the base-emitter forward voltage of the transistors 11 and 14 are within tolerated limits (specifically, within the voltage drop across the resistor 12), the threshold voltages of the comparator portions 1-1 and 1-2 are never higher than the drive voltage $V_M$ for the motor M. This prevents the problem described above.

Setting the threshold voltage $V_{th}$ for the voltage appearing at the output point of the phase that is not being energized in such a way that it is never higher than the drive voltage $V_M$ for the motor M is equivalent, if the situation is put in other words as which phase to energize being switched when the back electromotive force appearing in the coil of the phase that is not being energized crosses a threshold level, to setting this threshold level in such a way that it is never higher than zero.

This embodiment deals with a case where the open end of the coil of the phase that is not being energized is on the current outflow side when this coil is energized. In a case where the open end of the coil of the phase that is not being energized is on the current inflow side when this coil is energized, the threshold level used to switch which phase to energize when the back electromotive force appearing in the coil of the phase that is not being energized crosses the threshold level is set in such a way as to be never lower than zero. This makes it possible to prevent the motor's failure to rotate resulting from spike noise appearing in the coil of each phase when the coil of each phase is switched from an energized state to a de-energized state.

In this embodiment, the comparator portions 1-1 and 1-2 use separate threshold voltages; however, they may use a common threshold voltage. The pre-drive portion 3 may be omitted by incorporating it in the commutation portion 2. The output portion 4 may be composed of npn-type bipolar transistors.

Figure 7A:
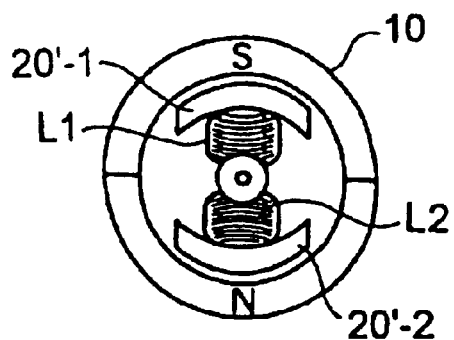
FIGS. 7A and 7B are diagrams showing the rotor at an electrically stationary point.
Figure 7B:
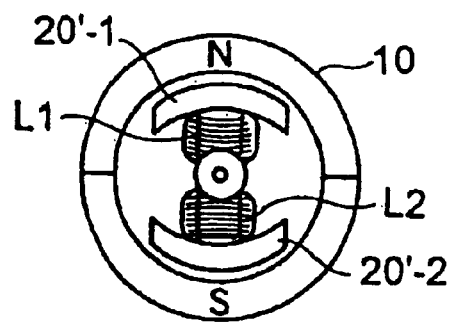

Now, the structure of a two-phase half-wave motor will be described. As shown in FIGS. 7A and 7B, a two-phase half-wave motor has dead points where its rotor 10 is located at an electrically stationary point (where the rotor 10 stabilizes when only the coil of a particular phase is energized, i.e. where the stators 20'-1 and 20'-2 are located right at the poles of the rotor magnet) and thus the torque is zero. When the rotor 10 is at rest at an electrically stationary point, the motor cannot be started.

Figure 8:
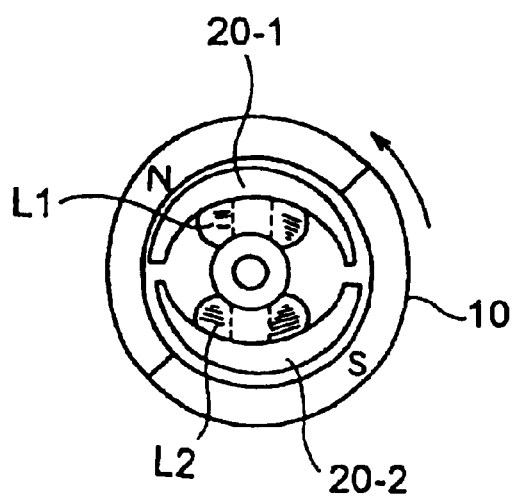
FIG. 8 is a diagram illustrating the structure of a motor that is designed not to come to rest at an electrically stationary point.

To avoid this problem, a two-phase half-wave motor is structurally so designed that the rotor does not come to rest at an electrically stationary point. Among many such designs, FIG. 8 shows an example in which the air gaps between the stators 20-1 and 20-2 and the rotor 10 are made narrower and narrower in the direction of rotation so that those air gaps have different widths at different points. As a result, when the motor is not energized, the rotor 10 is at rest in the state shown in FIG. 9B, or in the state in which it has rotated half a turn from the state shown in FIG. 9B (i.e. in the state similar to that shown in FIG. 9B but with the N and S poles of the rotor 10 reversed). This prevents the rotor from coming to rest at an electrically stationary point.

Figure 4:
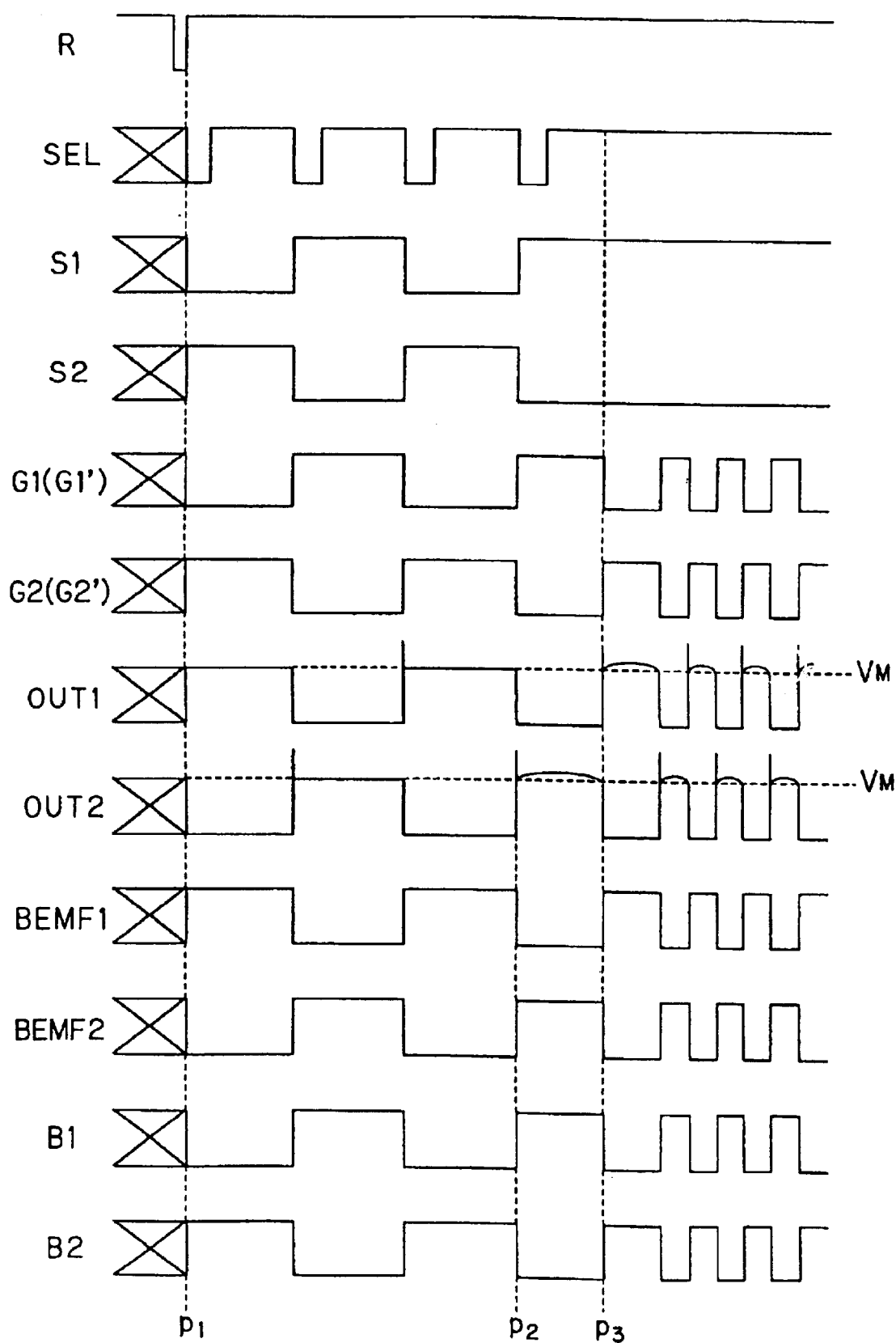
FIG. 4 is an example of a timing chart of relevant signals as observed when the motor is started.
Figure 9A:
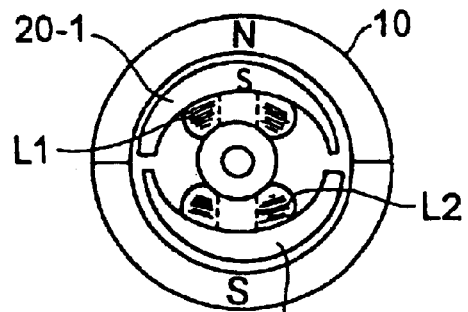
FIGS. 9A to 9D are diagrams showing how the rotor changes its position when the motor is started.
Figure 9B:
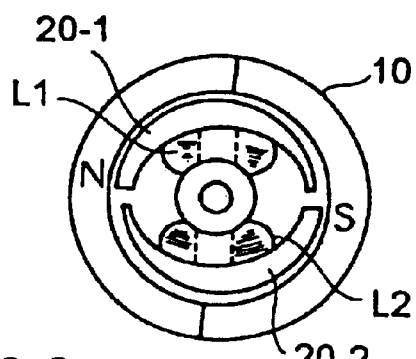

According to the staring method described earlier with reference to the timing chart shown in FIG. 4, the motor starts rotating in different directions between when started with the rotor 10 in the state shown in FIG. 9B and when started with the rotor 10 in the state in which it has rotated half a turn from the state shown in FIG. 9B. Therefore, in cases where the motor needs to be started in a prescribed direction, the starting method described earlier cannot be used.

Figure 10:
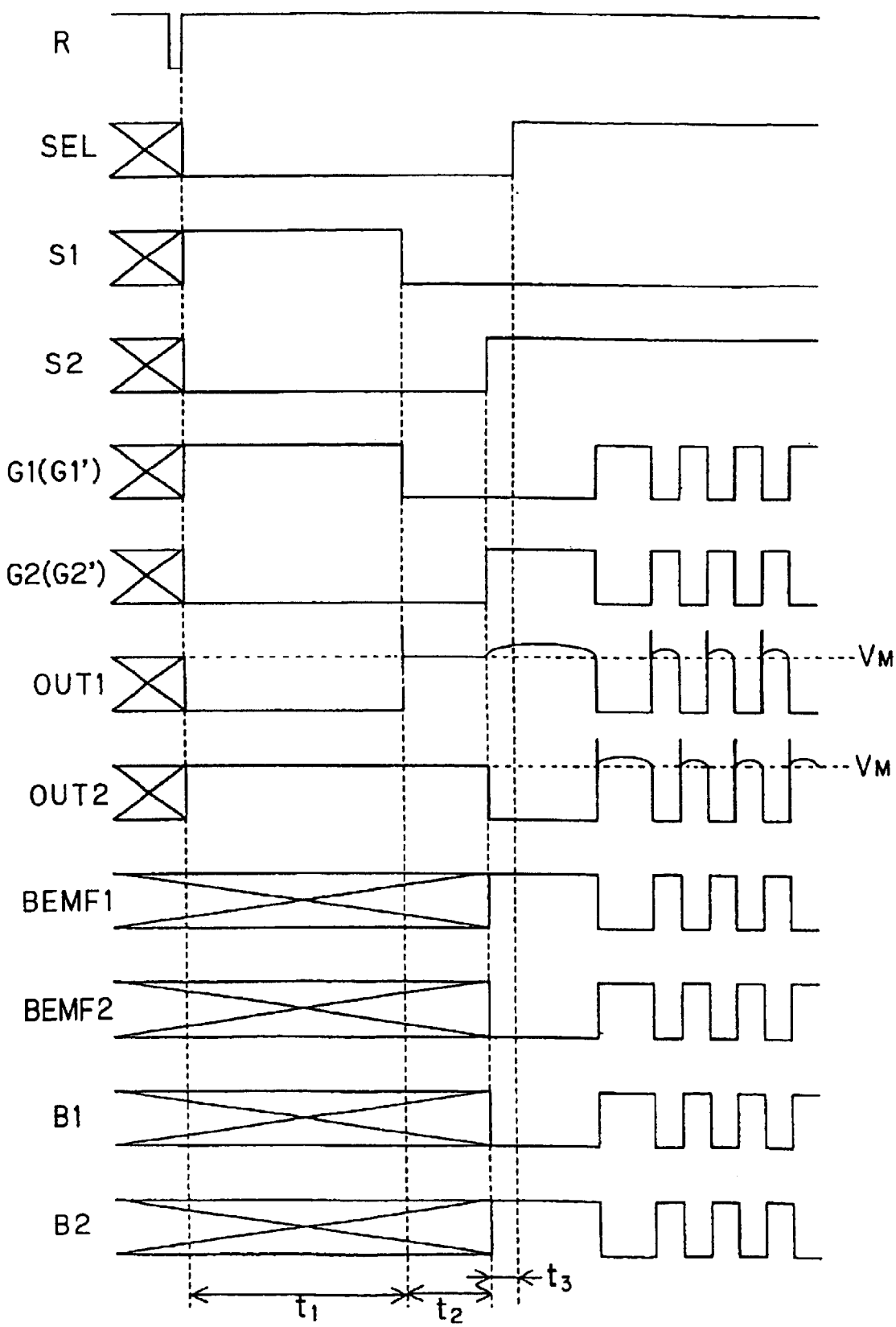
FIG. 10 is another example of a timing chart of relevant signals as observed when the motor is started.
Figure 11:
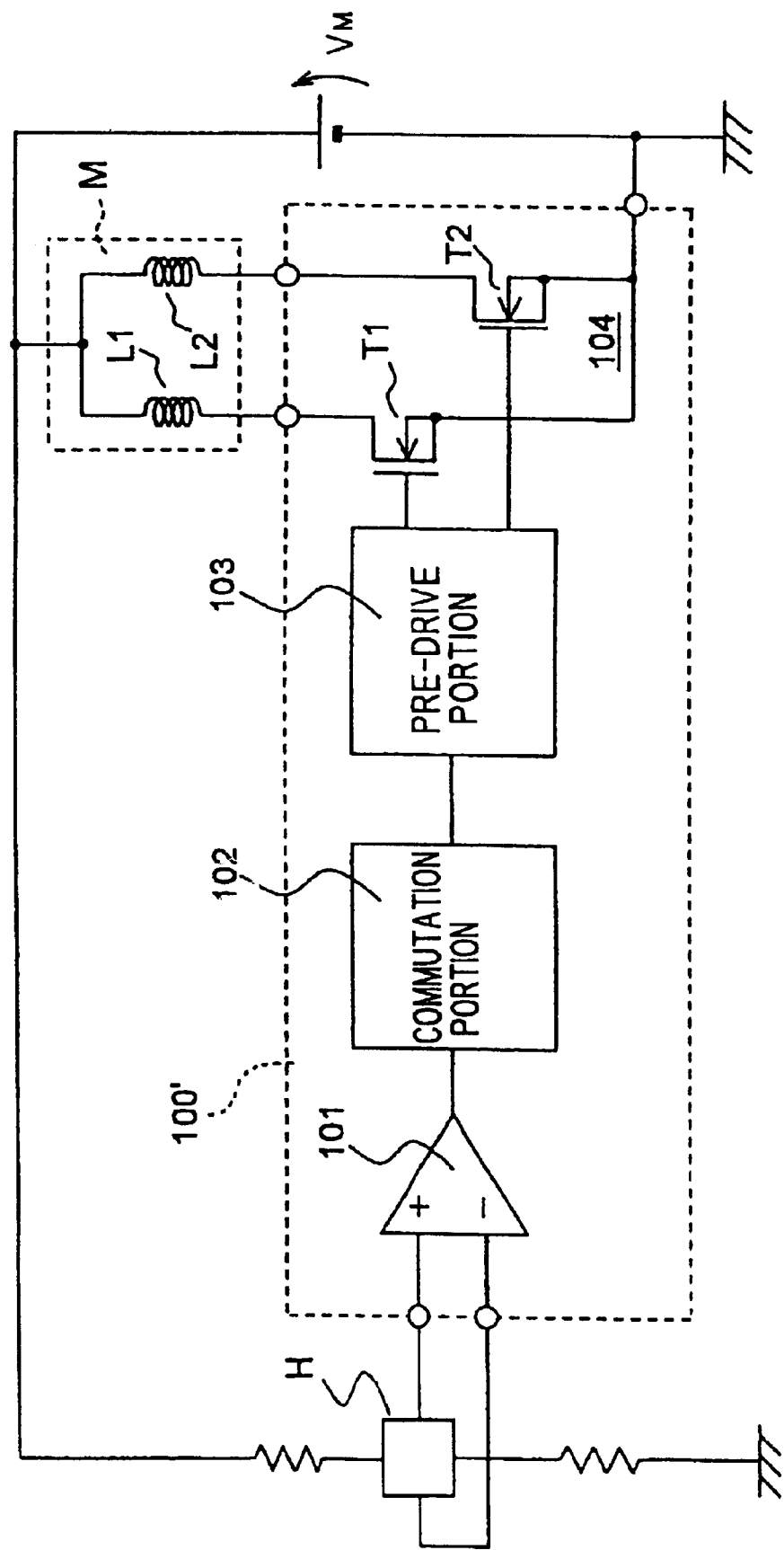
FIG. 11 is a block diagram of a conventional two-phase half-wave motor driving device.

Now, a staring method that permits the motor to be started always in the same direction will be described with reference to FIG. 10. When an internal reset signal R rises as a result of power-on resetting, the starter portion 5 keeps, for a predetermined period $t_1$, the select signal SEL at a low level, the starting signal S1 at a high level, and the starting signal S2 at a low level.

As a result, the transistor T1 turns on, and the first-phase coil L1 is energized. Thus, as shown in FIG. 9A, the rotor 10 is brought into a state fixed at an electrically stationary point. In this embodiment, it is assumed that the coil of the energized phase produces a magnetic field of the S pole. It is to be understood that, although the magnet is provided on the part of the rotor and the coils are provided on the part of the stators in the above description, it is also possible to provide instead the magnet on the part of a stator and the coils on the part of a rotor.

Next, the starter portion 5 keeps, for a predetermined period $t_2$, the select signal SEL at a low level, the starting signal S1 at a low level, and the starting signal S2 at a low level. As a result, both the first-phase coil L1 and the second-phase coil L2 are de-energized, and thus, as shown in FIG. 9B, the rotor 10 comes to rest in the position shown in FIG. 9B. It is to be understood that, with a fan motor or the like, in which requirements are rather lenient in terms of starting characteristics, the periods $t_1$ and $t_2$ may be set to be as long as several milliseconds to several seconds to achieve secure positioning.

Figure 9C:
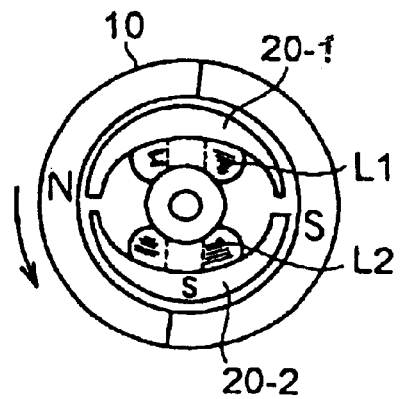
Figure 9D:
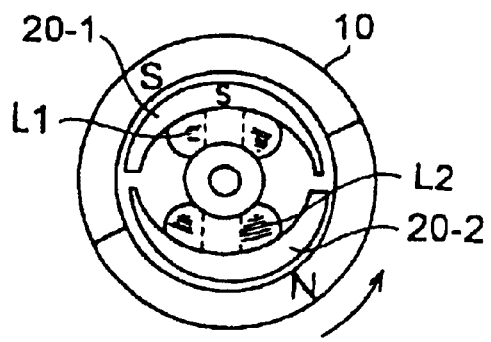

Next, the starter portion 5 keeps, for a predetermined period to, the select signal SEL at a low level, the starting signal S1 at a low level, and the starting signal S2 at a high level, and then turns the select signal SEL to a high level. As a result, the transistor T2 turns on, and the second-phase coil L2 is energized. Thus, as shown in FIG. 9C, the rotor 10 starts rotating in the direction indicated by an arrow. Thereafter, which phase to energize is switched every time the voltage at the output point of the phase that is not being energized drops below the threshold voltage of the corresponding comparator portion, and the rotation of the rotor is thereby maintained (FIG. 9D).

As described above, according to this starting method, first the rotor is brought to rest in a particular position (in the case being discussed, the state shown in FIG. 9B), and then the coil of a particular phase (in the case being discussed, the second-phase coil L2) is energized to start the motor. This permits the motor to start always in the same rotation direction, and thus helps prevent reverse rotation of the motor.

This method is intended for a motor that is so designed that its rotor does not come to rest at an electrically stationary point, and thus it brings the rotor into rest in a particular position (in the case being discussed, the state shown in FIG. 9B) by first energizing the coil of a particular phase (in the case being discussed, the first-phase coil L1) and then de-energizing the coils of both phases. Thus, the effect described above can be achieved with a simple circuit configuration.

The embodiment described above deals with a case where a two-phase half-wave motor is driven. It is to be understood, however, that the present invention helps prevent reverse rotation of a motor also in cases where the motor is of a single-phase all-wave type, three-phase half-wave type, three-phase all-wave type, or any other type.

TABLE 1

| BEMF2 | 0 | 0 | 1 | 1 |
|-------|---|---|---|---|
| BEMF1 | 0 | 1 | 0 | 1 |
| B1    | 0 | 0 | 1 | 0 |
| B2    | 0 | 1 | 0 | 0 |

What is claimed is:

1. A motor driving device for driving a motor by energizing a coil of a first phase and a coil of a second phase provided in the motor in one direction alternately,
    wherein which phase is energized is switched according to a back electromotive force appearing in the coil of each phase of the motor as a rotor of the motor rotates,
    wherein which phase to energize is switched when a back electromotive force appearing in the coil of the phase that is not being energized as the rotor rotates crosses a threshold level.

2. A motor driving device as claimed in claim 1, wherein the threshold level is so set that a voltage at an open end of the coil of the phase that is not being energized is not higher than zero if this end is on a current outflow side when this phase is energized, and that the voltage at the open end of the coil of the phase that is not being energized is not lower than zero if this end is on a current inflow side when this phase is energized.

3. A motor driving device for driving a motor by controlling energization of coils of individual phases of the motor according to a result of detecting a position of a rotor of the motor using an external sensor,
    wherein the motor is started by first bringing the rotor to rest in a particular position and then energizing the coil of a particular phase,
    wherein the motor driving device drives the motor by energizing a coil of a first phase and a coil of a second phase provided in the motor in one direction alternately,
    wherein which phase to energize is switched according to a back electromotive force appearing in the coil of each phase of the motor as the rotor of the motor rotates, and
    wherein which phase to energize is switched when a back electromotive force appears in the coil of the phase that is not being energized as the rotor rotates crosses a threshold level.

4. A motor driving device as claimed in claim 3, wherein the threshold level is so set that a voltage at an open end of the coil of the phase that is not being energized is not higher than zero if this end is on a current outflow side when this phase is energized, and that the voltage at the open end of the coil of the phase that is not being energized is not lower than zero if this end is on a current inflow side when this phase is energized.

* * * * *